(12) United States Patent
Levingston et al.

(10) Patent No.: US 6,488,802 B1
(45) Date of Patent: Dec. 3, 2002

(54) PIPE EXTRUSION PROCESS

(75) Inventors: Jerry C. Levingston, Rte. 2, Box 342, Salem, MO (US) 65560; J. Keith Beasley, Steelville, MO (US)

(73) Assignee: Jerry C. Levingston, Salem, MO (US)

( * ) Notice: Subject to any disclaimer, the term of this patent is extended or adjusted under 35 U.S.C. 154(b) by 153 days.

(21) Appl. No.: 09/633,000

(22) Filed: Aug. 4, 2000

Related U.S. Application Data

(62) Division of application No. 09/163,649, filed on Sep. 30, 1998, now Pat. No. 6,105,649.

(51) Int. Cl.⁷ .............................................. B65H 81/00
(52) U.S. Cl. ...................... 156/191; 156/192; 156/194; 156/195; 156/244.13
(58) Field of Search ................. 156/184, 194, 156/195, 192, 191, 244.13

(56) References Cited

U.S. PATENT DOCUMENTS

| | | | |
|---|---|---|---|
| 2,576,835 A | 11/1951 | Hewitt ........................ | 178/44 |
| 2,640,501 A | 6/1953 | Scott et al. .................... | 138/56 |
| 2,671,939 A | 3/1954 | Everhart et al. ............... | 25/30 |
| 2,874,722 A | 2/1959 | Hamblin ...................... | 138/53 |
| 3,811,478 A | 5/1974 | Ahlqvist ..................... | 138/154 |
| 3,839,126 A | 10/1974 | Haller ........................ | 156/497 |
| 3,917,500 A | 11/1975 | Petzetakis et al. .. | 156/244.13 X |
| 3,926,223 A | * 12/1975 | Petzetakis ................... | 138/129 |
| 4,642,158 A | 2/1987 | Steinel et al. ............... | 156/497 |
| 4,824,502 A | 4/1989 | Nagayoshi et al. ......... | 156/195 |
| 4,983,347 A | 1/1991 | Rahn .......................... | 264/508 |
| 5,127,442 A | 7/1992 | Blomqvist ................... | 138/154 |
| 5,261,988 A | 11/1993 | Dikis et al. ............. | 156/195 X |
| 5,271,794 A | 12/1993 | Jarrell et al. ................ | 156/578 |
| 5,591,292 A | 1/1997 | Blomqvist ............. | 156/244.13 |

FOREIGN PATENT DOCUMENTS

| | | |
|---|---|---|
| DE | 1093546 | 11/1960 |
| DE | 1943549 | 3/1971 |
| DE | 3830627 | 9/1989 |
| EP | 060482 | 9/1982 |
| EP | 223768 | 5/1987 |
| EP | 265915 | 5/1988 |
| EP | 418760 | 3/1991 |
| EP | 463611 | 5/1996 |
| FI | 82635 | 12/1990 |
| SE | 206175 | 7/1966 |

OTHER PUBLICATIONS

Cincinnati Milicron sales brochure entitled "TTL Series CNC Tape–Laying Machine Brings Automation To Thermoplastic Tape Laying," pp. 1 and 2, 1989.

* cited by examiner

*Primary Examiner*—Jeff H. Aftergut
(74) *Attorney, Agent, or Firm*—Senniger, Powers, Leavitt & Roedel

(57) ABSTRACT

A process of making a continuous thermoplastic helical seam profile pipe. The thermoplastic material is extruded through a die to form a continuous square tube. The continuous tube is cooled and a filler material is applied. The continuous tube bearing the applied filler material is helically wound to form turns of wound continuous tube. Each turn of the continuous tube is pressed into the preceding turn on the mandrel for adhering the turns together to form the pipe. Apparatus for producing a helical seam profile pipe includes a frame, and a mandrel mounted on the frame for rotation on the frame about a longitudinal axis of the mandrel to helically wind the thermoplastic tube around the mandrel. A source of filler material, and a filler material applicator located adjacent to the mandrel continuously apply a bead of the filler material to the thermoplastic tube prior to being wound on the mandrel.

16 Claims, 9 Drawing Sheets

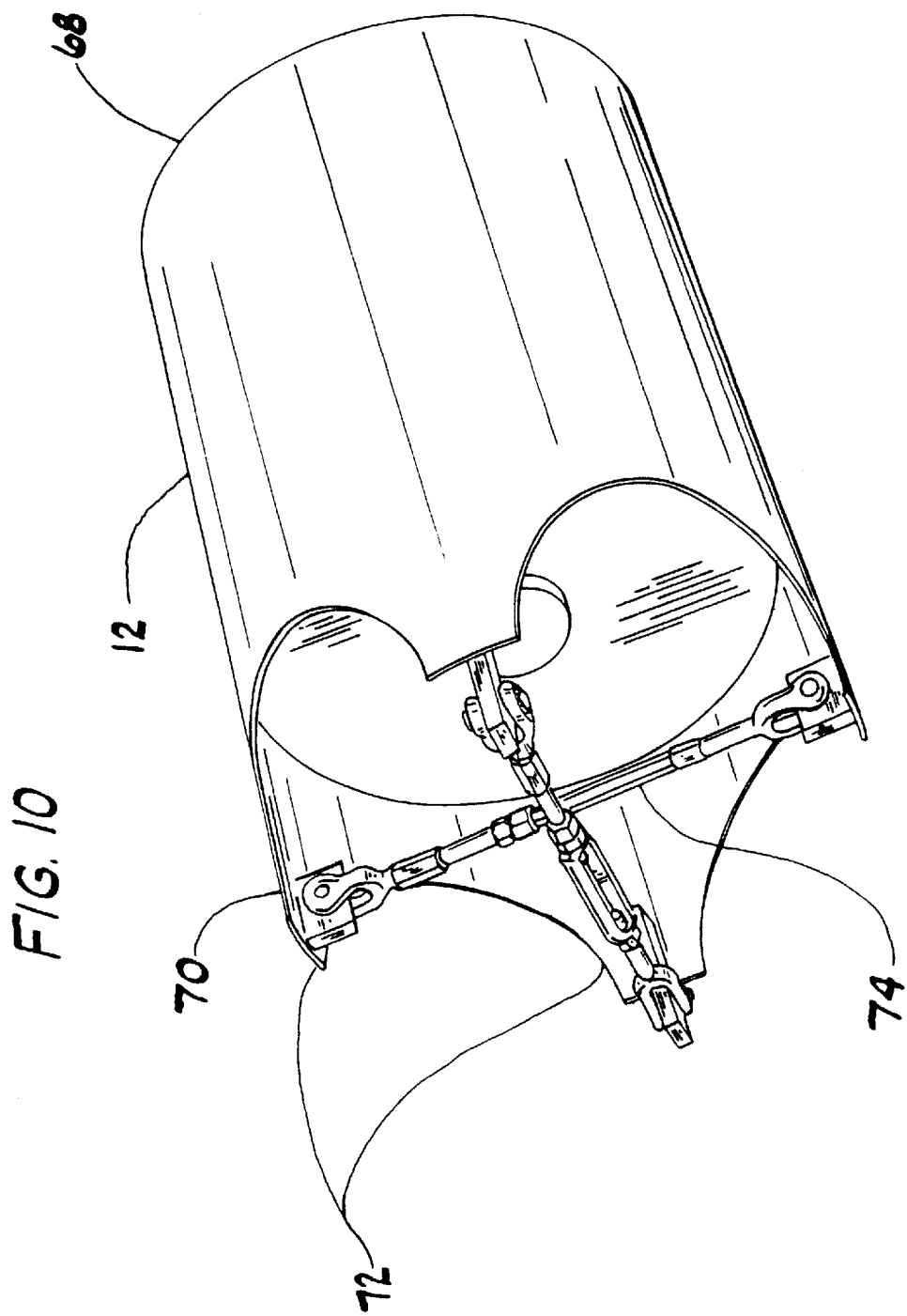

PIPE EXTRUSION PROCESS

CROSS-REFERENCE TO RELATED APPLICATION

This application is a division of application Ser. No. 09/163,649, filed Sep. 30, 1998, now U.S. Pat No. 6,105,649.

BACKGROUND OF THE INVENTION

This invention relates generally to large-diameter ducts, tubes, or cylindrical containers, and in particular to a process and apparatus for the continuous production of thermoplastic helical seam profile pipe.

Thermoplastic pipes of large diameter have found widespread use in storm and sanitary sewers, roadway drainage projects, and anyplace where gravity-flow conduit is useful. Pipes composed of high density polyethylene (HDPE) thermo-plastic provide strength, durability, corrosion resistance, light weight, long service life, and cost effectiveness.

The continuous production of thermoplastic pipe and cylindrical containers has been accomplished in prior art using, among other methods, the helical seam technique. In that system, a strip of thermoplastic in a heated, plastic state is wound around a cylindrical surface or mandrel to produce a succession of turns of the strip which laterally abut or overlap each other. The abutting or overlapping turns are joined together, thereby forming a helically-wound pipe of any desired length.

In practice, helical pipes formed of strips of a tubular profile have demonstrated superior strength and rigidity to those formed of strips that are substantially flat. Pipes made from flat strips are often susceptible to being crushed when buried in the ground and exposed to radially-inward directed compression forces. By contrast, pipes made of wound hollow tubular profile strips exhibit good load distribution characteristics and can withstand larger forces.

Although superior in strength, the manufacture of tubular profile pipes has proven difficult. The steps of forming, winding, joining, and cooling are more complex when the continuous strip of hot thermoplastic is a hollow tube. Previous tubular profile designs have used thermal butt welds to join abutting turns of tube, whereby hot, un-cooled tubular strips are wound together. Abutting turns are naturally welded together on contact by the heat energy residual within the thermoplastic. A disadvantage is that a substantial portion of cooling must be accomplished after the tubular strips are wound. This necessitates compromises in the shape and design of the mandrel to accommodate air circulation or other cooling scheme.

Further, external seams or joints, at regions where abutting turns of pipe are joined can be uneven, resulting in an unsightly appearance. If the inconsistencies are severe, a pipe may have reduced strength when exposed to bending or compression loads.

SUMMARY OF THE INVENTION

Among the several objects and features of the present invention may be noted the provision of a process for forming profile wall pipe which forms pipe continuously; the provision of such a process and which produces pipe which has high strength and low weight; the provision of such a process which produces pipe having a commercially acceptable appearance; and the provision of such a process which are economical to use.

Briefly, a process of the present invention for making a continuous thermoplastic helical seam tubularprofile pipe comprises melting thermoplastic material, extruding the thermoplastic material through a die to form a continuous tube. The continuous tube is cooled and a molten filler material is applied to the cooled tube. The continuous tube bearing the applied filler material is helically wound on a mandrel, thereby forming turns of wound continuous tube. Each turn of the continuous tube is pressed into the preceding turn on the mandrel for joining the turns to form the pipe.

Other objects and features will be in part apparent and in part pointed out hereinafter.

BRIEF DESCRIPTION OF THE DRAWINGS

FIG. 10 is a perspective view of a mandrel.

Corresponding reference characters indicate corresponding parts throughout the drawings.

DETAILED DESCRIPTION OF THE PREFERRED EMBODIMENT

Figure 1:
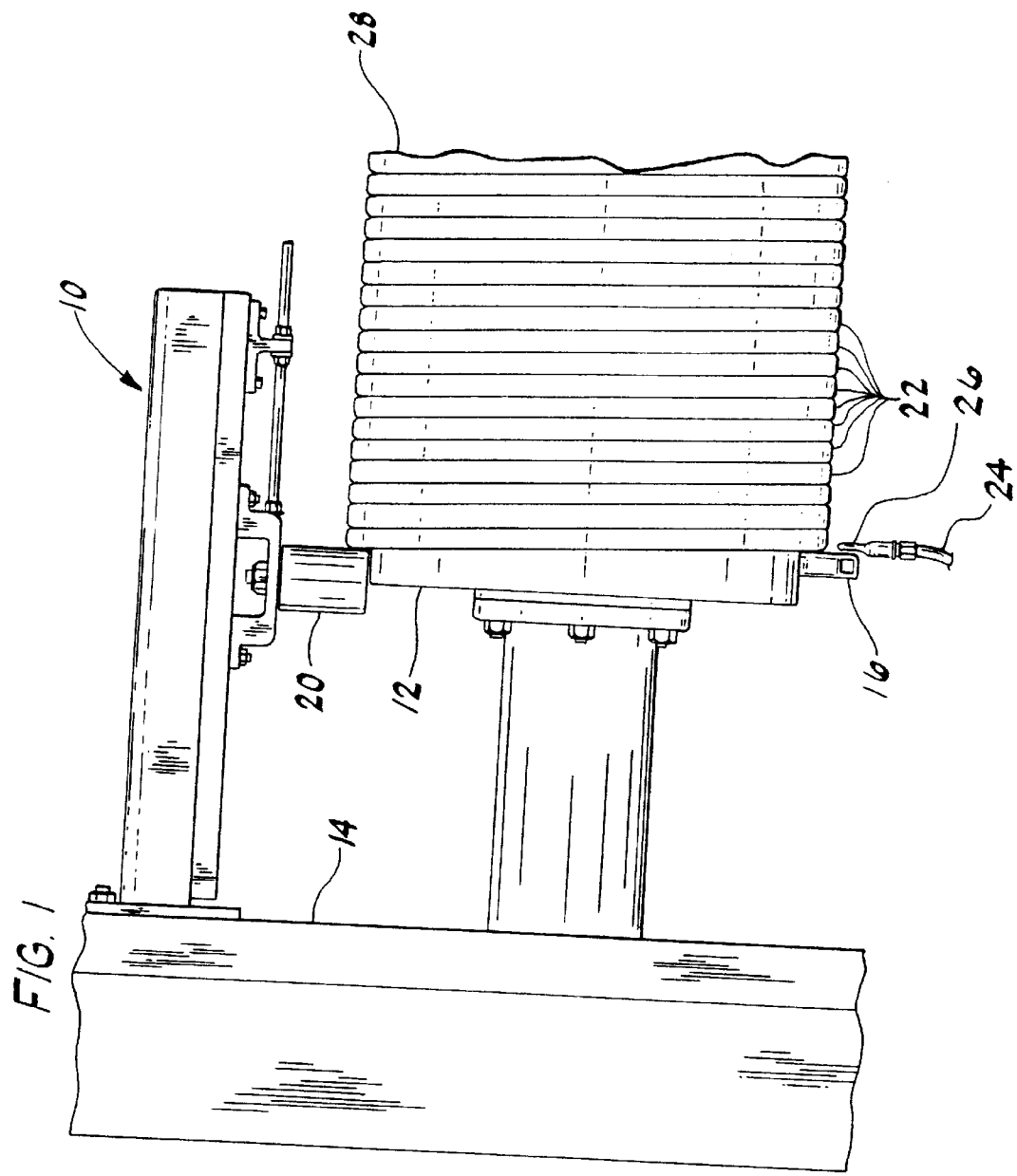
FIG. 1 is a fragmentary elevational view of apparatus of the present invention showing a frame and mandrel for winding a thermoplastic continuous tube to produce helical seam profile pipe.

Referring now to the drawings and in particular to FIGS. 1, 3, 5, & 6, an apparatus for producing a helical seam profile pipe from thermoplastic tube having a generally rectangular cross section is indicated generally at 10.

The apparatus 10 includes a rotatable mandrel 12 mounted on a frame 14 for rotation about a longitudinal axis of the mandrel. A continuous tube 16 of a thermoplastic material such as HDPE is supplied to the mandrel 12 as it rotates, and is helically wound on the mandrel. A first roller 18 (FIG. 9) and a second roller (FIGS. 1 & 9) guide the thermoplastic tube onto the mandrel into a generally helical configuration, forming adjacent turns 22.

The apparatus also includes a conduit 24 that conveys molten filler material to an applicator 26 located adjacent to the mandrel 12. The applicator 26 continuously applies filler material to the tube 16 prior to being wound on the mandrel 12. Each new turn 22 of thermoplastic tube 16 is brought into engagement with the preceding turn so that the applied filler material is brought into contact with a wall of the thermoplastic tube in the preceding turn for joining the new turn to the preceding turn. The first roller 18 and second roller 20 press each turn into the preceding turn on the mandrel 12. The turns 22 collectively form a thermoplastic helical seam profile pipe 28 of substantially any desired length.

Figure 2:
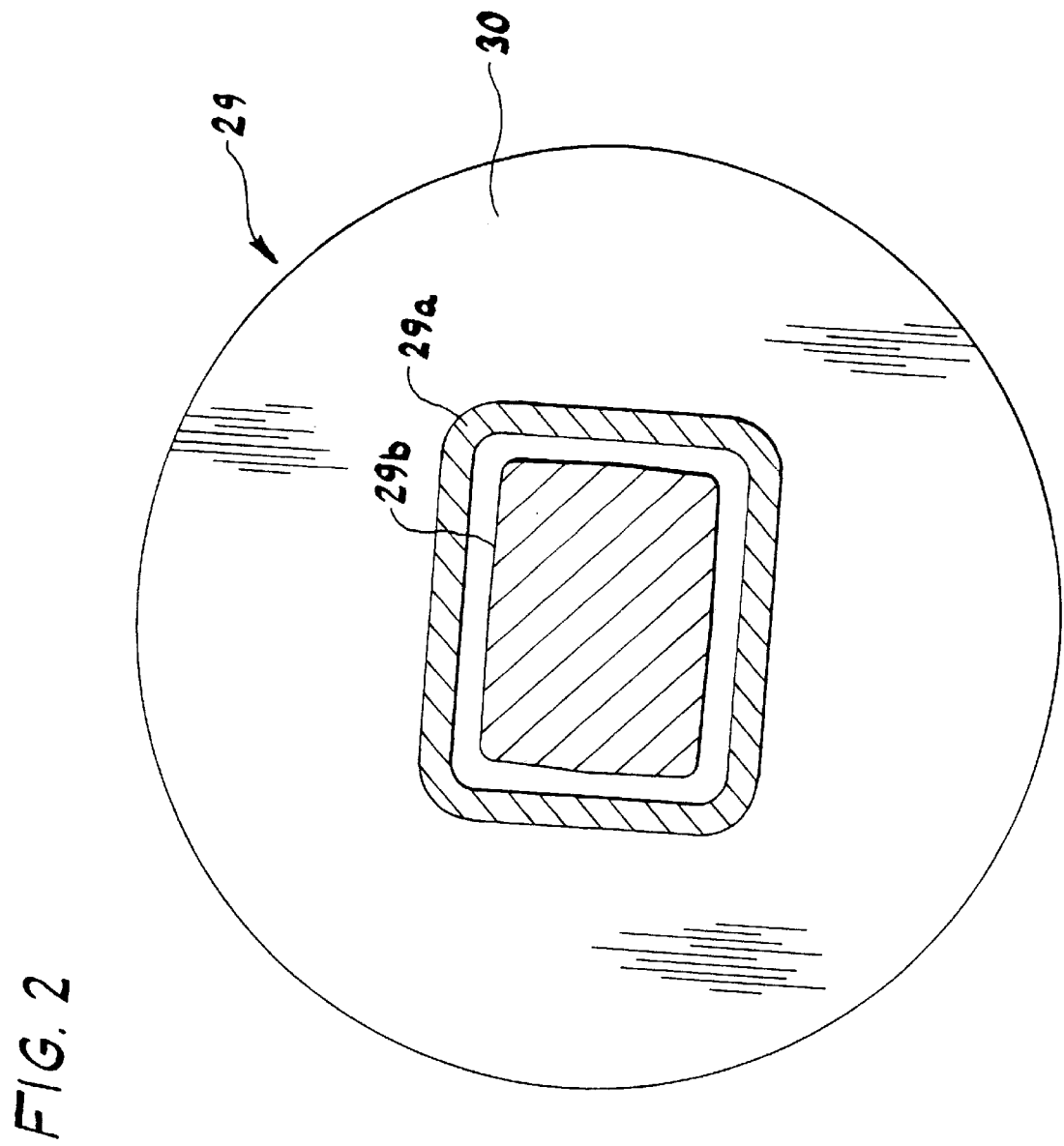
FIG. 2 is an elevational view of a die for extruding a continuous tube of thermoplastic.
Figure 3:
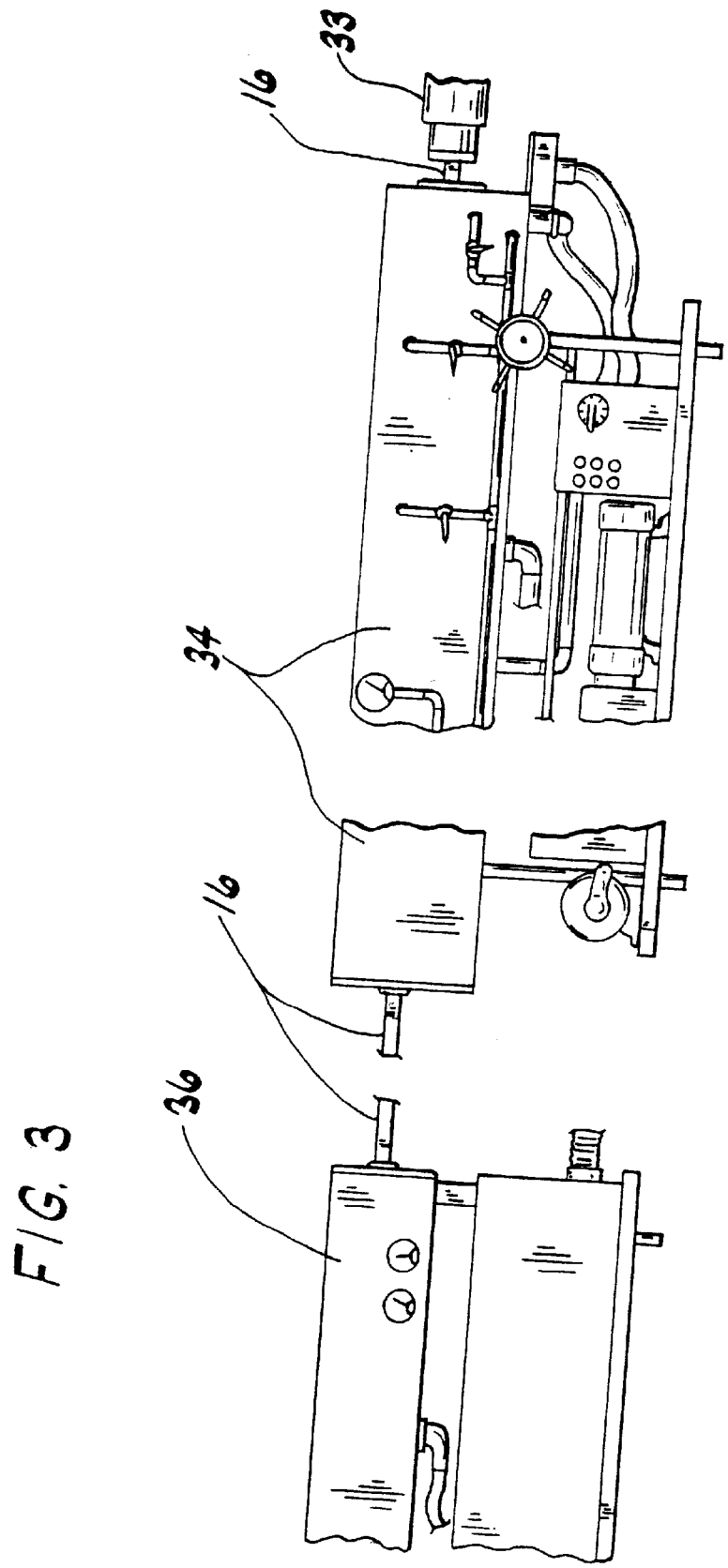
FIG. 3 is a fragmentary elevational view of the apparatus showing two cooling devices that reduce the temperature of the continuous tube of thermoplastic and a canister containing a die that forms the continuous tube.

A process of making thermoplastic helical seam profile pipe begins by forming the continuous tube 16. As established in the art, an extruder device (not shown) melts thermoplastic material and extrudes it through a die 29 (FIG. 2). In practice, a type of extruder found useful has been a 3½-inch model equipped with temperature control manufactured by Akron Extruders, Inc. of Canal Fulton, Ohio. Extruders of other sizes may be employed without departing from the scope of the present invention. The die 29 is configured to form molten thermoplastic into the cross-sectional shape of square tube 16, described hereinafter. The die 29 includes a flange 30 and is adapted to fasten the die 29 within a canister 33 of the extruder. The die further includes a tubular outer member 29a and a solid inner member 29b. The outer member 29a defines the shape of the exterior of the continuous tube 16 and the inner member 29b defines the shape of the interior of the continuous tube.

The continuous tube 16 of thermoplastic proceeds out from the cannister 33 in a very hot, collapsed plastic state. The continuous tube 16 is substantially cooled and solidified during passage through a first cooling device 34 and a second cooling device 36. Each cooling device is an elongate water tank designed for uniform flood cooling of continuous tubes. As established in the art, flood cooling tanks such as first and second cooling devices 34, 36 provide water turbulence to break up any temperature strata that form around the tube 16 for improved cooling efficiency. Types of cooling devices found useful are those manufactured by Metaplast Ltd. of Canada or Conair Gatto of Bay City, Mich.

In practice, it has been found useful for the first cooling device 34 to also comprise a vacuum sizing tank. As established in the art, vacuum sizing tanks provide a decreased atmospheric pressure in the tank above the water. Pressure within the hollow tube 16, which is greater than that within first cooling device 34, expands the collapsed tube to provide a smooth, accurate profile shape corresponding to the shape formed by the die 29. In practice, a vacuum sizing tank manufactured by Metaplast Ltd., having three sections of selectable pressure, has been effective. Pressure levels in a first section of the first cooling device 34 between 8 and 12 inches of mercury below atmospheric pressure have been useful to cause the tube 16 to expand to a desired shape. Pressure levels in the second and third sections of about 6 and 2 inches of mercury vacuum, respectively, maintain the desired tube shape as the thermoplastic solidifies as it passes through the first cooling device 34.

After passage through the first and second cooling devices 34, 36, the thermoplastic tube 16 is cooled to a temperature level that provides a self-sustaining cross-sectional shape. However, the tube 16 remains sufficiently pliant and bendable to permit winding on the mandrel 12.

Figure 4:
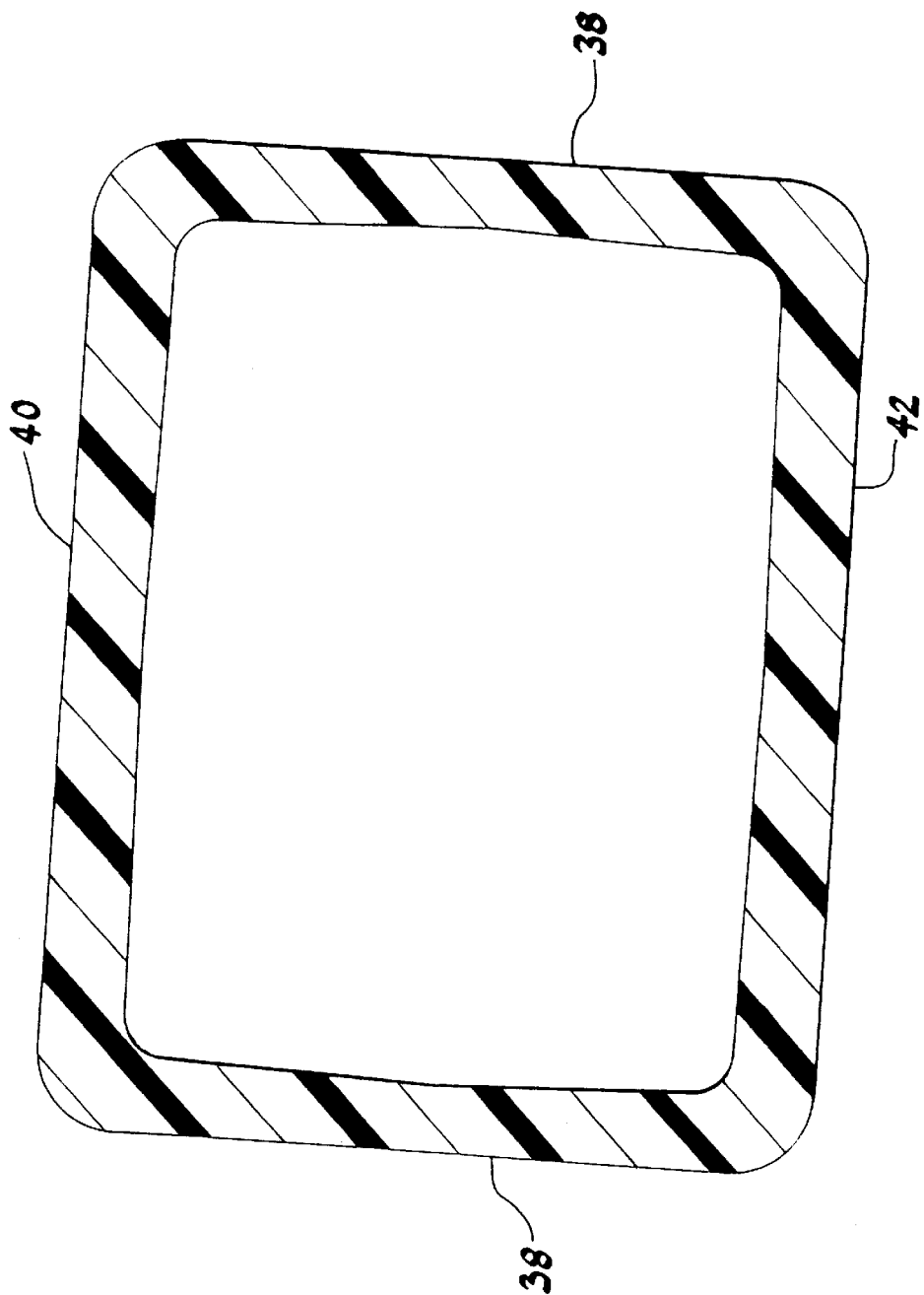
FIG. 4 is an enlarged cross-sectional view of the continuous tube of thermoplastic.

Referring now to FIG. 4, a cross-section of the continuous tube 16 is shown. The cross-section is generally rectangular, and includes opposed lateral walls 38, an upper wall 40, and a lower wall 42. Each wall 38, 40, and 42 has a straight external edge to facilitate formation of the pipe 28. When wound on the mandrel 12, the lateral walls 38 abut adjacent turns 22, the upper wall 40 engages the mandrel surface and forms an internal surface of the pipe 28, and the lower wall 42 forms an external surface of the pipe. The cross-section has rounded corners, and it has a variable wall thickness, being generally greater in thickness at a corner than a mid-wall location. More specifically, the thickness of the lateral walls 38 tapers, on the inside of the tube 16 from the corners to the center of the wall such that the inner surface of such lateral wall is about two degrees from vertical. The thickness of the upper and lower walls 40, 42 tapers such that the inner surface of such wall is about one degree from horizontal.

It has been found that a cross-section of the tube 16 having ratio of width to height equal to a length ratio of upper wall 40 to lateral wall 38, of about 1.25 works well. In addition, a ratio of minimum wall thickness to wall length of about 0.07 to 0.10 works well for a sturdy construction. Other dimension ratios, however, are envisioned to be within the scope of this invention. The following dimensions have worked well in practice: 2.91 inch length of walls 40 and 42, 0.228 inch minimum thickness of walls 40 and 42, 2.32 inch length of wall 38, and 0.196 inch minimum thickness of wall 38.

Figure 5:
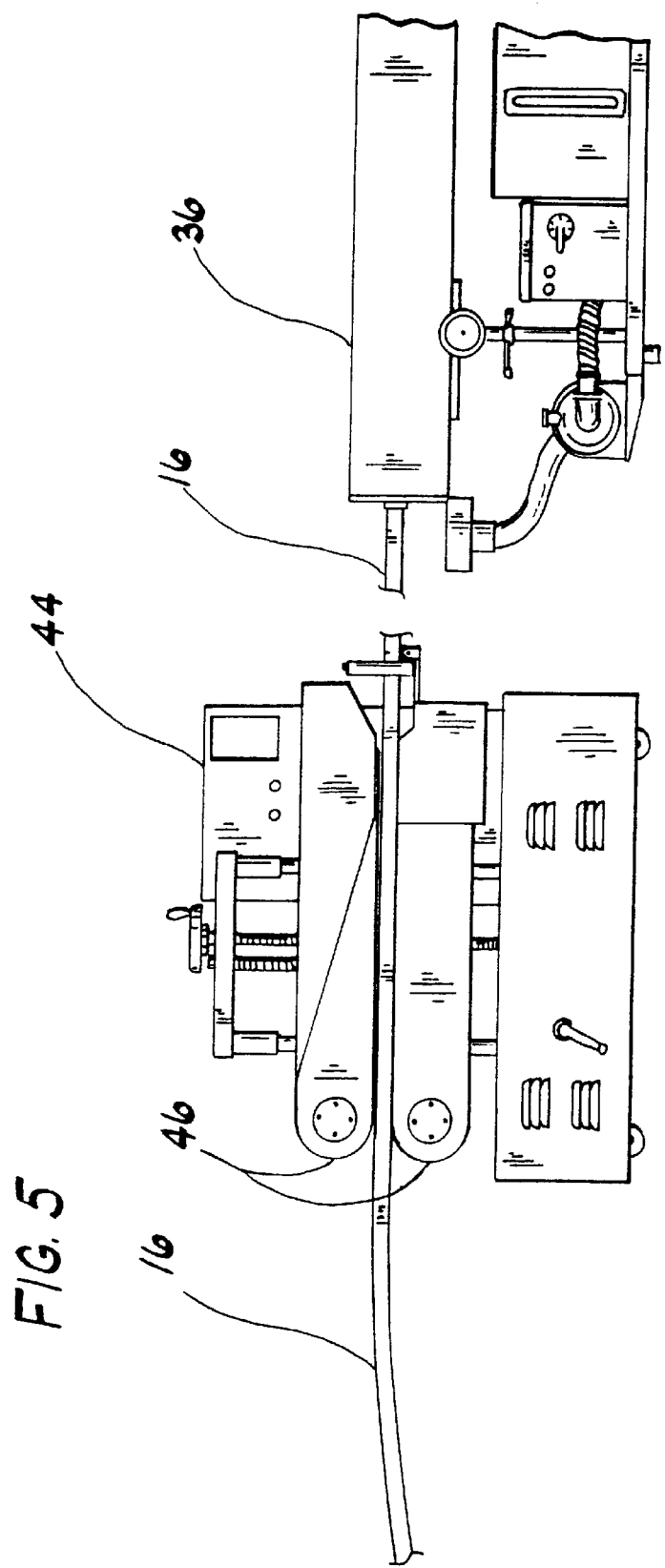
FIG. 5 is an elevational view of a belt puller of the apparatus that pulls the continuous tube of thermoplastic and shows a portion of one of the cooling devices.

Referring now to FIG. 5, the continuous tube 16 travels into a belt puller 44. The belt puller provides the motive force that pulls the extruded continuous tube 16 from the canister 30 and through the first and second cooling devices 32, 34. As established in the art, belt puller 44 contains motor-driven belts 46 that grip the continuous tube and pull. In practice, a series 1000 belt puller manufactured by Conair Gatto has worked well. After passage through the belt puller 44, the continuous tube 16 travels to the mandrel 12 for winding thereon.

Figure 6:
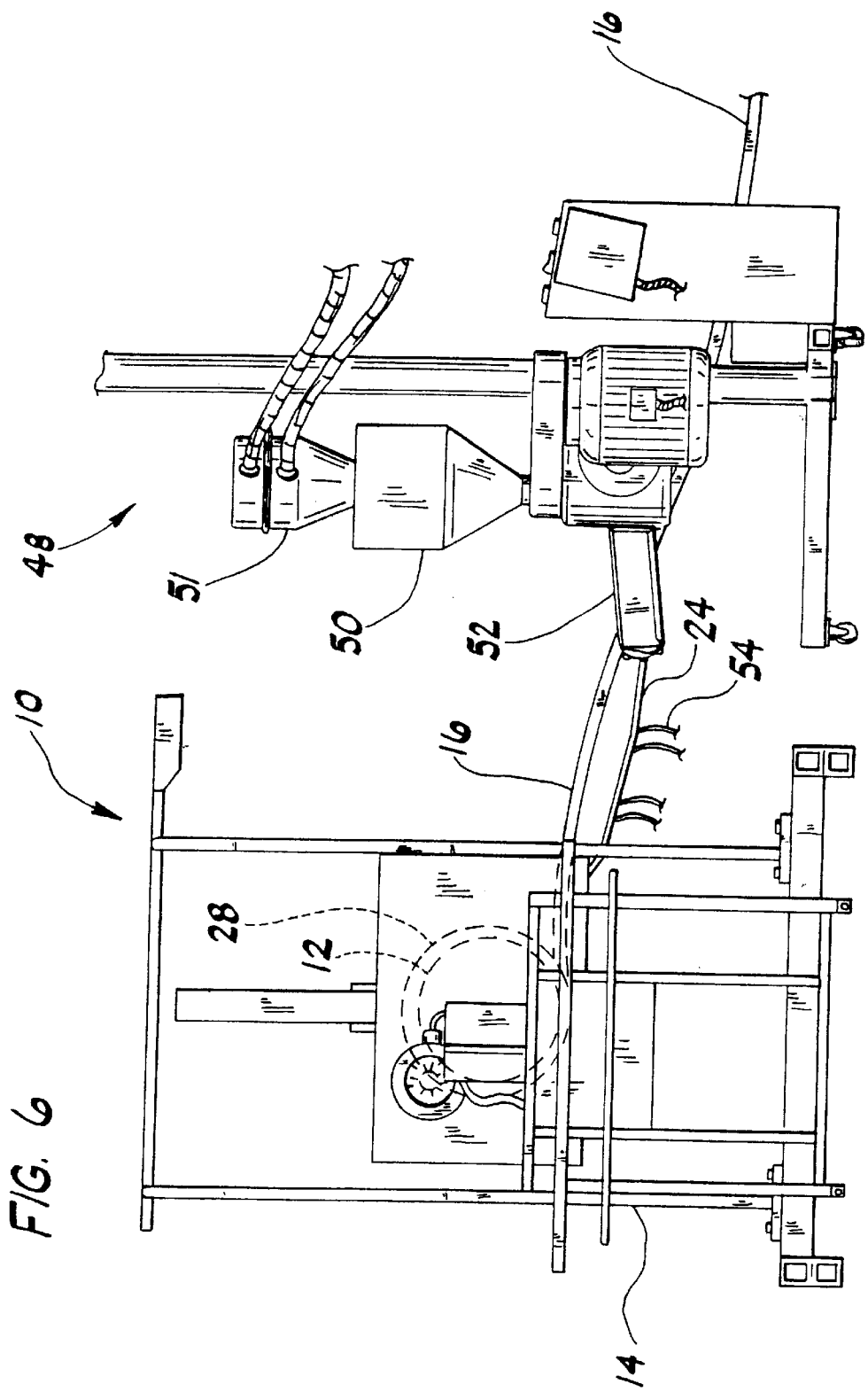
FIG. 6 is an elevational view of the frame that supports the mandrel and a source of molten filler material.

Referring now to FIG. 6, a source of molten filler material is indicated generally at 48. The function of filler material is to fuse abutting turns 22 of tube 16 together. In practice, it has been found efficient to use filler material made from thermoplastic of the same composition as that forming the continuous tube 16. In that way, the same polymer material may be procured for both the tube and the filler material, thereby providing simplicity.

The source of molten filler material 48 includes a hopper 50 into which a supply of solid thermoplastic is deposited by a vacuum feeder 51. An extruder 52 melts the thermoplastic and pumps it in liquid form into the filler material conduit 24. The conduit has heaters placed therealong to keep the thermoplastic molten as it flows toward the mandrel 12. Electrical lines 54 provide power to the heaters on the conduit 24.

In the illustrated embodiment, the extruder 52 is manufactured by Akron Extruders, Inc. The conduit 24 is ¾-inch stainless steel tubing. Heaters keep the filler material at a temperature level preferably between 465 and 510° F. (and most preferably at about 500° F.) so that the filler material will remain on the lateral wall 38 when applied and to adequately fuse abutting turns 22 together.

Also depicted in FIG. 6 is the frame 14. The frame is constructed of steel or other sturdy material to support the mandrel 12 for rotation relative to the frame. Rotation of the mandrel 12 is driven by an electric motor (not shown) mounted on the frame 14. The frame is adjustable in vertical and horizontal directions to selectively position the mandrel 12 at a desired location.

Figure 7:
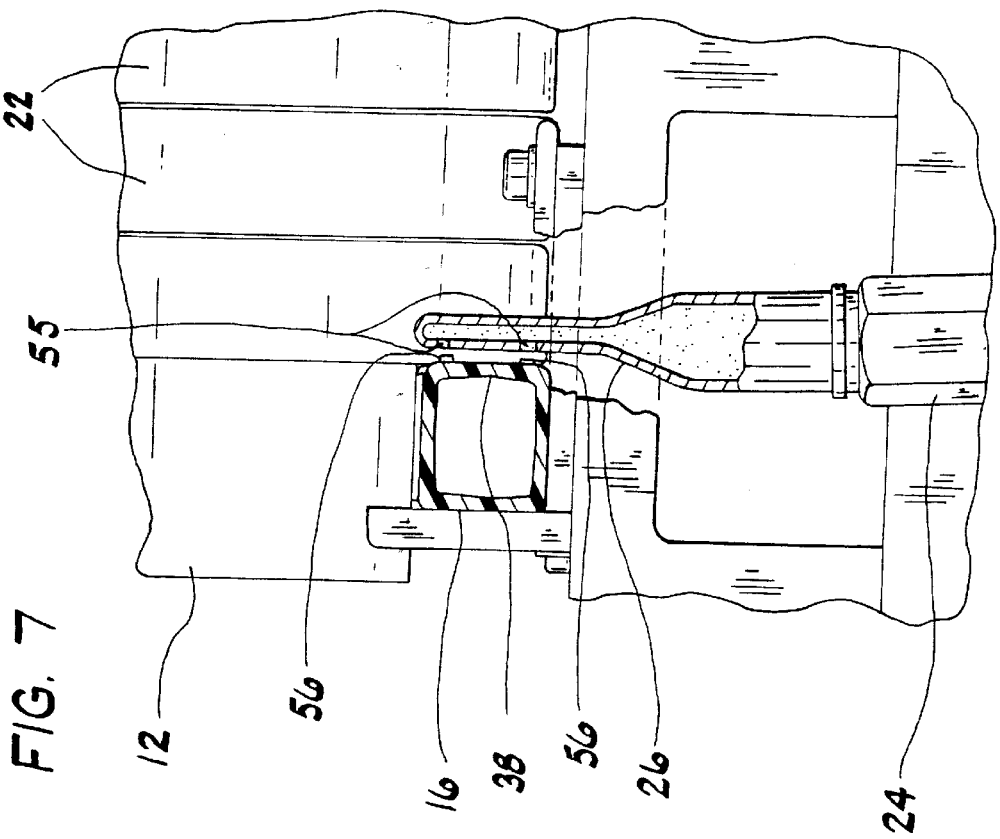
FIG. 7 is an enlarged fragmentary elevational view of a filler material applicator located adjacent to the mandrel.

Referring now to FIG. 7, the conduit 24 supplies molten filler material to the applicator 26. The applicator is positioned adjacent the continuous tube 16 at a point immediately before it is wound on the mandrel 12. The applicator 26 has two outlets 55 for dispensing the filler material in two spaced apart beads 56 upon one of the lateral walls 38 of the continuous tube 16. Each bead 56 forms a stripe of filler material extending lengthwise along continuous tube 16 as it passes the applicator 26. The beads 56 are preferably located near the top and bottom of lateral wall 38. However, a different placement of the beads or use of a single bead of filler material are included within the scope of this invention.

Figure 9:
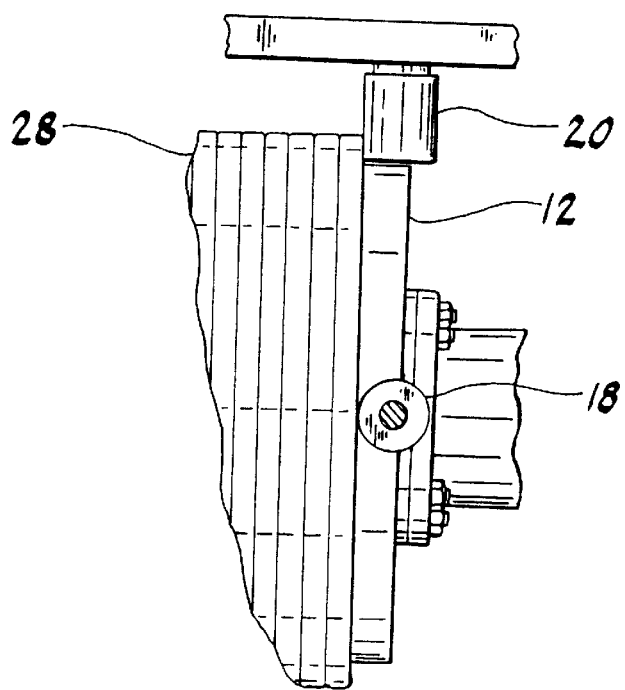
FIG. 9 is a fragmentary end elevational view of the mandrel and frame showing a pair of rollers located in axially and circumferentially offset positions on the mandrel.

Referring now to FIG. 9, the first roller 18 and the second roller 20 guide the thermoplastic tube onto the mandrel into a generally helical configuration. The rollers 18, 20 are located in axially and circumferentially offset positions on the mandrel 12, and apply force to the tube 16 lengthwise of the mandrel to press the pipe 28 to slide along the surface of the mandrel. The offset positions of the rollers 18, 20 establish the helical path of the tube 16, since the tube must travel from the first roller 18 to the second roller 20, thereby moving axially lengthwise of the mandrel while rotating circumferentially.

Figure 8:
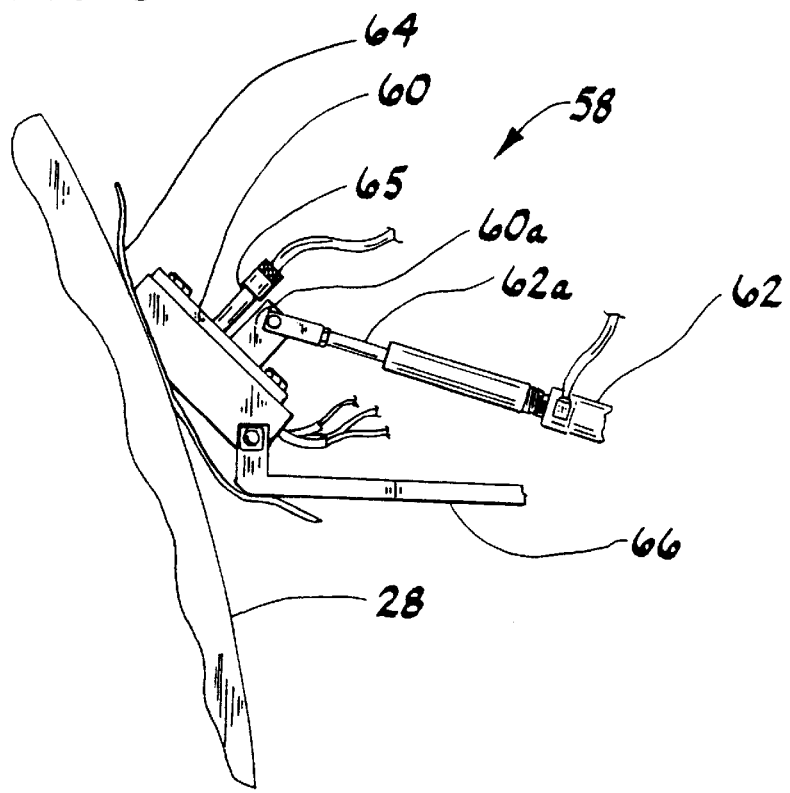
FIG. 8 is a fragmentary transverse section through the mandrel and pipe showing a wiper disposed adjacent to the mandrel for wiping the pipe in a joint between adjacent turns of thermoplastic tube.

Referring now to FIG. 8, a wiper assembly for pressing the regions where abutting turns 22 are joined is indicated generally at 58. The wiper assembly compresses the pipe 28 at joints between abutting turns to smooth the pipe and shape the filler material, thereby enhancing strength and external appearance. The wiper assembly 58 is located adjacent the pipe 28, positioned within about two turns 22 of the first roller 18.

The wiper assembly 58 includes a heater block 60 for applying heat, a cylinder 62 for applying a controlled force, a sheet 64 of low friction material for engaging the pipe and filler material, and a support bracket 66 for upholding the assembly. A rod 62a of the cylinder 62 is pivotally mounted on an upstanding tab 60a of the block 60 and the bracket 66 is pivotally connected to a lower end of the block to permit some movement of the block. In the preferred embodiment, the sheet 64 is made of polytetra-fluoroethylene (TEFLON). A temperature sensor 65 mounted on heater block 60 provides information to control the heater block, thereby maintaining the sheet 64 at a constant temperature.

The cylinder 62 applies a constant force against the pipe 28. That force, together with the applied heat, align the turns 22 and re-distribute and wipe filler material at joints to obtain a smooth, uniform external contour. In practice, about 200 pounds force have been applied by the cylinder 62, although other forces are within the scope of this invention.

Referring now to FIG. 10, the mandrel 12 is displayed without any tube 16 wound thereon and apart from the apparatus 10. The mandrel 12 produces pipe 28 of circular internal cross-section, because the cylindrical external surface of the mandrel shapes and molds the pipe. The diameter of the mandrel 12 is therefore selected for a desired inner diameter of pipe 28. To produce a smaller diameter pipe, the mandrel 12 is removed from frame 14 and replaced with a mandrel of smaller size.

In the preferred embodiment, the mandrel is of a circular cross-section in order to produce cylindrical pipe having a circular internal cross-section. However, other cross-sectional shapes are envisioned, such as elliptical or rectangular, to produce unconventional pipe geometries if desired.

The mandrel 12 has an originating end 68 and a distal end 70, oriented so the continuous tube 16 is first wound on the originating end. The distal end 70 has two sets of diametrically opposed ears 72 formed thereon and two variable length turnbuckles 74 extending between the opposed ears.

A diameter of the distal end 70 of mandrel 12 may be selectively varied by changing the length of the turnbuckles 74. In practice, the diameter of the distal end 70 may be varied by as much as about 8% of its nominal length.

An increase in the diameter of the distal end 70 relative to originating end 68 increases resistance to axial travel of pipe 28 on the mandrel 12, because axial movement simultaneously requires slight stretching of diameter. Therefore, the axial force applied by rollers 18, 20 must increase to continue helically winding and moving the pipe 28 along the surface of mandrel 12. The result is a more tightly wound pipe 28.

When the pipe 28 is wound to a desired length, rotation of the mandrel 12 is stopped and the pipe is removed for delivery. The pipe 28 is removed simply by cutting off the pipe at the desired length. The process is continuous and theoretically may form pipes of arbitrary length.

As various changes could be made in the above constructions without departing from the scope of the invention, it is intended that all matter contained in the above description or shown in the accompanying drawings shall be interpreted as illustrative and not in a limiting sense.

What is claimed is:

1. A process of making a continuous thermoplastic helical seam profile pipe, comprising:

melting thermoplastic material;

extruding the thermoplastic material through a die to form a continuous tube;

cooling the continuous tube;

applying a filler material to the cooled continuous tube;

helically winding the continuous tube bearing the applied filler material on a mandrel, thereby forming turns of wound continuous tube, wherein the mandrel has a smooth, continuous external surface, an originating end, a distal end, a diameter at the originating end that is generally fixed and a diameter at the distal end is selectively adjustable to adjust resistance to movement of the tube along the mandrel, and at least one variable length connector extending directly and continuously between opposite sides of the distal end of the mandrel;

pressing each turn of the continuous tube into the preceding turn on the mandrel so that the filler material on the turn engages the preceding turn for joining the turns to form the pipe; and changing a length of said at least one variable length connector, thereby changing the diameter of the mandrel at the distal end to adjust resistance to movement of the tube along the mandrel.

2. A process as set forth in claim 1 wherein said step of extruding comprises extruding the molten thermoplastic material to form the continuous tube having a generally rectangular exterior cross section, the continuous tube including opposed lateral walls, said step of applying a filler material comprising applying the filler material to one of said lateral walls.

3. A process as set forth in claim 2 wherein said step of applying the filler material further includes applying spaced apart beads of filler material on said one lateral wall.

4. A process as set forth in claim 3 wherein the beads each extend lengthwise of the continuous tube.

5. A process as set forth in claim 2 further comprising the step of compressing the pipe at a joint between adjacent turns of the continuous tube for smoothing and shaping the filler material at the joint.

6. A process as set forth in claim 5 wherein the compressing step includes heating the filler material as it is compressed.

7. A process as set forth in claim 1 wherein the step of extruding the thermoplastic material comprises forming the thermoplastic material into a substantially square tube including opposed outer and inner walls, and opposed lateral walls.

8. A process as set forth in claim 7 wherein the step of forming the thermoplastic material includes forming the opposed lateral walls thinner than the outer and inner walls.

9. A process as set forth in claim 7 wherein the step of forming the thermoplastic material includes forming walls having greater thickness at their corners than at mid-wall locations.

10. A process as set forth in claim 1 wherein the mandrel further has four equally spaced ears on the distal end forming two pairs of diametrically opposed ears with a variable length connector extending between each pair of opposed ears, each variable length connector comprising a turnbuckle connector, and wherein said step of changing a length of at least one variable length connector further comprises turning at least one turnbuckle connector.

11. A process of making a continuous thermoplastic helical seam profile pipe, comprising:
melting thermoplastic material;
extruding the thermoplastic material through a die to form a continuous tube;
cooling the continuous tube;
applying a filler material to the cooled continuous tube;
helically winding the continuous tube bearing the applied filler material on a mandrel, thereby forming turns of wound continuous tube; and
pressing each turn of the continuous tube into the preceding turn on the mandrel so that the filler material on the turn engages the preceding turn for joining the turns to form the pipe;
wherein said step of applying a filler material comprises applying filler material to only one wall of the tube and wherein said step of pressing each turn into the preceding turn comprises bringing said one wall of the tube having filler material applied thereto to another wall of the preceding turn free of filler material prior to engagement with the filler material on said one wall of the turn.

12. A process as set forth in claim 11 wherein said step of applying filler material to one wall of the tube includes applying at least one continuous bead of filler material to said one wall.

13. A process as set forth in claim 12 wherein said step of applying filler material comprises applying two continuous beads to said one wall.

14. A process as set forth in claim 11 wherein said step of applying filler material to one wall of the tube is carried out upstream from the mandrel.

15. A process for forming thermoplastic tube having a generally rectangular cross section and winding the tube to make a helical seam profile wall pipe, the process comprising the steps of:
extruding molten thermoplastic material with a first extruder;
delivering the extruded material through a die for forming the thermoplastic tube, the die being configured to form the molten thermoplastic material into a generally rectangular cross-section having non-uniform wall thickness wherein the thickness tapers on an inside surface of the tube, with greater thickness at a corner region of the cross-section than at a mid-wall location;
cooling the tube exiting the die using at least one cooling device;
winding the tube on a mandrel for rotation about a longitudinal axis of the mandrel to helically wind the thermoplastic tube around the mandrel forming adjacent turns of the tube on the mandrel;
extruding filler material with a second extruder;
applying a substantially continuous bead of the filler material to the thermoplastic tube prior to being wound on the mandrel using a filler material applicator located adjacent to the mandrel, said applicator receiving filler material from the second extruder, each new turn of the thermoplastic pipe being brought into engagement with the preceding turn such that the applied filler material is brought into contact with a wall of the thermoplastic tube in the preceding turn for joining the new turn to the preceding turn.

16. A process as set forth in claim 15 wherein said step of delivering the extruded material through the die further comprises using a die configured for forming the thermoplastic tube to have four walls including an upper wall, a lower wall and opposing lateral walls between the upper and lower walls thereof, the upper and lower walls each extending between the lateral walls, and wherein the die is shaped to form the walls such that the ratio of minimum wall thickness of each wall to the dimension of the wall between adjacent walls is about 0.07 to 0.10.

* * * * *